US008224741B2

(12) United States Patent
Maynard

(10) Patent No.: US 8,224,741 B2
(45) Date of Patent: Jul. 17, 2012

(54) COMPLEX ORDER LEG SYNCHRONIZATION

(75) Inventor: Greg Maynard, Port Washington, NY (US)

(73) Assignee: International Securities Exchange, LLC, New York, NY (US)

( * ) Notice: Subject to any disclaimer, the term of this patent is extended or adjusted under 35 U.S.C. 154(b) by 543 days.

(21) Appl. No.: 12/110,900

(22) Filed: Apr. 28, 2008

(65) Prior Publication Data

US 2009/0271308 A1  Oct. 29, 2009

(51) Int. Cl.
*G06Q 40/00* (2012.01)
(52) U.S. Cl. ............................................. 705/37; 705/35
(58) Field of Classification Search ...................... 705/35
See application file for complete search history.

(56) References Cited

U.S. PATENT DOCUMENTS

| | | | |
|---|---|---|---|
| 3,573,747 A | 4/1971 | Adams et al. | 340/172.5 |
| 3,581,072 A | 5/1971 | Nymeyer | 235/152 |
| 4,412,287 A | 10/1983 | Braddock, III | 364/408 |
| 4,674,044 A | 6/1987 | Kalmus et al. | 364/408 |
| 4,903,201 A | 2/1990 | Wagner | 364/408 |
| 4,980,826 A | 12/1990 | Wagner | 364/408 |
| 5,101,353 A | 3/1992 | Lupien et al. | 364/408 |
| 5,126,936 A | 6/1992 | Champion et al. | |
| 5,136,501 A | 8/1992 | Silverman et al. | 364/408 |
| 5,297,032 A | 3/1994 | Trojan et al. | 364/408 |
| 5,305,200 A | 4/1994 | Hartheimer et al. | 364/408 |
| 5,664,115 A | 9/1997 | Fraser | 705/37 |
| 5,689,652 A | 11/1997 | Lupien et al. | 395/237 |
| 5,715,402 A | 2/1998 | Popolo | 705/37 |
| 5,787,402 A | 7/1998 | Potter et al. | 705/37 |
| 5,845,266 A | 12/1998 | Lupien et al. | |
| 5,905,974 A | 5/1999 | Fraser et al. | 705/37 |
| 5,913,202 A | 6/1999 | Motoyama | 705/35 |
| 5,924,082 A | 7/1999 | Silverman et al. | 705/37 |
| 5,946,666 A | 8/1999 | Nevo et al. | |
| 5,950,177 A | 9/1999 | Lupien et al. | |

(Continued)

FOREIGN PATENT DOCUMENTS

EP 0411 748  5/1990

(Continued)

OTHER PUBLICATIONS

Trading Technologies' X_TRADER 7, The Technical Analyst, Jul./Aug. 2006, pp. 41-44.*

(Continued)

*Primary Examiner* — William Rankins
(74) *Attorney, Agent, or Firm* — Frommer Lawrence & Haug LLP

(57) ABSTRACT

A system is provided for trading complex orders for financial instruments, including complex orders that include legs that are to be executed on different markets. The legs of the order are optionally specified to be executed in a particular ratio, at net price, and/or at a range of net prices. The system halts trading for all legs in one market, determines a quantity and price to execute a second leg of the order on the other market to achieve a specified ratio or net price and then submits the second leg for execution on the other market if the second leg remains marketable on the other market. If an execution is received from the other market, then the legs in the first market are executed and the series unfrozen. If the other market has not responded after a predetermined time, then the legs in the first market are unfrozen and trading continues.

16 Claims, 3 Drawing Sheets

U.S. PATENT DOCUMENTS

| | | | | |
|---|---|---|---|---|
| 5,970,479 | A | 10/1999 | Shepherd | 705/37 |
| 5,978,779 | A | 11/1999 | Stein et al. | 705/37 |
| 6,012,046 | A | 1/2000 | Lupien et al. | |
| 6,014,627 | A | 1/2000 | Togher et al. | |
| 6,014,643 | A | 1/2000 | Minton | 705/37 |
| 6,016,483 | A | 1/2000 | Rickard et al. | |
| 6,035,288 | A | 3/2000 | Solomon | 705/37 |
| 6,076,068 | A | 6/2000 | DeLapa et al. | 705/14 |
| 6,112,189 | A | 8/2000 | Rickard et al. | 705/37 |
| 6,247,000 | B1 | 6/2001 | Hawkins et al. | |
| 6,317,727 | B1 | 11/2001 | May | 705/37 |
| 6,377,940 | B2 | 4/2002 | Tilfors et al. | |
| 6,405,180 | B2 | 6/2002 | Tilfors et al. | |
| 6,456,982 | B1 | 9/2002 | Pillipovic | |
| 6,560,580 | B1 | 5/2003 | Fraser et al. | |
| 6,618,707 | B1 | 9/2003 | Gary | |
| 6,671,818 | B1 | 12/2003 | Mikurak | |
| 7,162,447 | B1 | 1/2007 | Cushing | |
| 7,162,448 | B2 | 1/2007 | Madoff et al. | |
| 2001/0044767 | A1 | 11/2001 | Madoff | |
| 2002/0010673 | A1 | 1/2002 | Muller et al. | |
| 2002/0052827 | A1* | 5/2002 | Waelbroeck et al. | 705/37 |
| 2002/0133454 | A1 | 9/2002 | Malitzis et al. | |
| 2002/0169704 | A1* | 11/2002 | Gilbert et al. | 705/37 |
| 2003/0046218 | A1 | 3/2003 | Albanese et al. | |
| 2003/0135444 | A1 | 7/2003 | Annamalai et al. | |
| 2004/0267655 | A1* | 12/2004 | Davidowitz et al. | 705/37 |
| 2006/0271468 | A1 | 11/2006 | Rosenthal et al. | |
| 2007/0005488 | A1* | 1/2007 | Keith | 705/37 |
| 2007/0118457 | A1* | 5/2007 | Peterffy et al. | 705/37 |
| 2009/0094151 | A1* | 4/2009 | Mortimer et al. | 705/37 |
| 2009/0276363 | A1* | 11/2009 | Newhouse et al. | 705/80 |
| 2012/0047062 | A1* | 2/2012 | Robinson | 705/37 |

FOREIGN PATENT DOCUMENTS

| | | |
|---|---|---|
| EP | 0 952 536 A1 | 10/1999 |
| EP | 1 528 497 | 5/2005 |
| WO | WO 93/15467 | 8/1993 |
| WO | WO 96/34357 | 4/1996 |
| WO | WO 97/03408 | 7/1996 |
| WO | WO 97/42591 | 11/1997 |
| WO | WO 98/38844 | 9/1998 |
| WO | WO 00/28449 | 4/1999 |

OTHER PUBLICATIONS

Free for All in Electricity Sector?, Actualidad Economica, Sep. 30, 1996.

Souter, Gavin, Bermuda's Reinsurers Eager to Please, Business Insurance, vol. 28, No. 44, p. 77, Oct. 31, 1994.

U.K.: Branch Closures Hit Poorer Customers, Guardian, p. 18, Feb. 11, 1997.

Eric K. Clemons, "Information Technology and Screen-Based Securities Trading," Management Science, vol. 43, No. 12, Dec. 1997.

Schmerken, Ivy, "The Pandora's Box over Autoquotes," Wall Street & Technology, vol. 15, No. 3, Mar. 1997.

Chicago Board of Trade, Project a Customer Information Statement.

Alex Frino and Jayaram Muthuswamy, Price and time-Priority Versus Pro-Rata Algorithms in Electronically Traded Futures, Department of Finance, University of Sidney, Oct. 3, 1998.

Eric K. Clemons and Bruce W. Weber, "Segmentation, Differentiation, and Flexible Pricing: Experiences with Information Technology and Segment-Tailored Strategies," Journal of Management Information Systems, vol. 11, No. 2, Fall 1994.

Cosgrove, Suzanne, Courting Retail, Institutional Customers, CBOE, AMEX get Creative, Knight-Ridder Financial News, Jan. 29, 1993.

Michaels, George, Distributed Electronic Ordering System, financial software from Financial Technology Corp., Wall Street Computer Review, vol. 8, No. 11, pp. 53-55, Aug. 1991.

Amihud et al., Liquidity, Asset Prices and Financial Policy, Financial Analysts Journal, vol. 47, No. 6, pp. 56-66, Nov./Dec. 1991.

Self-Regulatory Organizations: Notice of Proposed Rule Change . . . Introduction of the CBOE Hybrid System, F.Reg., vol. 68, No. 77 at 19865-74, Apr. 22, 2003.

SEC to Wall Street, Play Fair with the little guy, Wall Street & Technology, Jan. 1, 1997.

Schmerken, Ivy, The Bulls and Bears come out at night, Dealer's Digest, vol. 7, No. 12, p. 14, Sep. 1990.

Estimating the Components of the Bid/Ask Spread; Glosten and Harris; Journal of Financial Economics; May 1988.

Why Market Maker Position Limits Should be Delta-Based; Ritchie and Ginter; Futures; Aug. 1988.

Default Risk and Innovation in the Design of Interest Rate Swaps; Brown and Smith; Financial Management; Summer 1993.

The Relationship Between Option Trading Intensity and the Market Microstructure of the Underlying Security; Mayhew, Sarin, and Shastri; Leavey School of Business; Mar. 1996.

BBA—British Banker's Association—Revision of the IDS: Market Structure, Transparency and Liquidity; http://www.bba.org.uk/bba/jsp/polopoly.

Random Walk Computer, Inc., White Paper: ECN Aggregators—Increasing Transparency and Liquidity in Equity Matters.

Complaint and Demand for Jury Trial, Chicago Board Options Exchange, *Incorporated* v. *International Securities Exchange, LLC.*

Journal of Management Information Systems, vol. 11, No. 2, Fall 1994, Eric K. Clemons and Michael C. Row, "Special Section: Strategic and Competitive Information Systems".

\* cited by examiner

COMPLEX ORDER LEG SYNCHRONIZATION

FIELD OF THE INVENTION

This invention relates generally to markets for trading financial instruments. In particular, the present invention relates to an automated exchange for matching and executing complex orders consisting of multiple legs that are executed on different markets where trading in at least one leg is frozen while another leg is executed in another market.

BACKGROUND OF THE INVENTION

Embodiments of the present invention are directed to the execution of complex orders for equity options contracts and underlying equities. As discussed more fully below, the present invention is not limited to complex orders for equity options, but is applicable to trading complex orders for other types of financial instruments, for example, index options contracts, futures contracts, stocks, bonds, exchange traded funds, security futures, commodities, treasury instruments, currencies, and the like as well as combinations of such instruments. Known markets for trading these other instruments suffer from the same shortcomings as do equity option markets, and the advantages of the invention are applicable to these instruments as well.

Investors often wish to purchase or sell different option contacts related to the same underlying security at the same time, as part of an overall investment strategy to take advantage of anticipated movements in the price of underlying equities or to hedge their investments against such fluctuations. For example, some well known strategies are "butterflies," "spreads," "straddles," "strangles," and the like. Each of these strategies requires that the investor purchase and sell a number of different financial instruments related to the same underlying security. Orders for such transactions are called complex, combination, combo, or spread orders. For simplicity, these will be referred to herein as complex orders. Each purchase or sale of a security making up the complex order is referred to as a "leg" of the complex order.

For example, a "straddle" is an order to buy (or sell) a number of call option contracts and the same number of put option contracts on the same underlying security with the same exercise price and expiration date. A complex order to execute a straddle consists of two legs; the first leg is an order to buy, for example, two XYZ July 50 calls and the second leg to buy two XYZ July 50 puts. Such an order allows the investor to benefit if the price of the underlying equity XYZ goes significantly above or below the strike price of 50. An investor might place such an order if he anticipated high volatility in the stock price but wants to benefit whether the stock price actually rises or falls.

An investor could execute a straddle by making two separate transactions, that is, submit a buy order for the call options and submit a second buy order for the put options. The investor faces the risk that both transactions will not execute (or will not execute at the preferred price and time) and he will be left with only the put or only the call options. This is called "leg" or "market" risk.

Executing a complex order on known exchanges requires the services of a market professional called a specialist. The specialist receives the complex order and, if he feels it is profitable, executes each leg of the transaction himself or finds existing orders on the market against which he can execute the legs of the complex order. The specialist must devote considerable time and effort to evaluate the profitability of a complex order and/or assemble the necessary counter orders on the market. The specialist is able to command a high commission to execute such orders. In addition, the effort required to execute complex orders often results in these orders being "traded through" or passed over by regular orders that are later in time. Also, because execution of each leg of the order does not take place simultaneously, there is still leg risk. Specialists rarely assume this risk themselves, leaving this for the investor to face. As a result, complex orders traded on known exchanges were costly to investors, had reduced liquidity, and placed investors at market or leg risk.

As discussed above, complex orders can include both an option contract and the equity underlying that option. Two significant trading strategies in these markets include delta neutral trading and buy write trading. These are complex trading strategies, the primary purpose of which is to generate limited premium with limited risk. For example, an investor might wish to purchase call options in a stock and at the same time sell short a certain number of shares of the same stock such that upward movement in the stock price (which diminishes the value of the short sale position) results in a corresponding increase in the value of the call options. In order to achieve the minimum of risk, such an investor may wish to balance the price movement in its option and stock positions to achieve a "delta neutral" position by purchasing (or selling) a certain ratio of options contracts to stock shares.

Such trading strategies today have certain limitations, however, due to the fragmentary nature of markets. Since there is no single market for trading all types of financial instruments that can comprise a complex order, users of these strategies have added "leg risk." This is because one leg must be executed at one market, and another leg at another market, usually involving different individuals and systems. As a result, two specialists or brokers must cooperate to execute this type of complex order, also resulting in less liquidity and higher commissions. In addition, because prices on both markets may fluctuate continuously, the final price for the complex order cannot be known until all legs are executed. Different markets may also offer different amounts of liquidity. This presents a difficulty in executing a complex order that requires a certain ratio of one instrument to another if the number of instruments on one market is insufficient to fully satisfy one leg of a complex order. If the amount of one instrument is limited, the amount of the other instrument purchased must be adjusted to achieve the desired ratio. This is also true for complex orders for other types of instruments (i.e., futures contracts and the underlying commodity, bond futures and bonds, and the like).

The options market first developed in the 1970s. Since that time, options for the purchase and sale of listed stocks have traded domestically only on floor-based exchanges, for example, the American Stock Exchange (AMEX). The method of trading options contracts in these floor-based environments is known as an "open outcry" system because trading takes place through oral communications between market professionals at a central location in open view of other market professionals. In this system, an order is typically relayed out to a trader standing in a "pit." The trader shouts out that he has received an order and waits until another trader or traders shout back a two-sided market (the prices at which they are willing to buy and sell a particular option contract), then a trade results. In an effort to preserve this antiquated system of floor-based trading, the transition to and use of computer-based technology on these exchanges have been slow. Although some processes that take place on these floor-based exchanges have been automated or partially automated, they are not fully integrated and, in fact, many processes continue to function manually. As a result, there are many problems with the existing floor-based system that have caused large inefficiencies and inadequacies in order handling and price competition in the options market, and have harbored potential for abuse and mistakes.

These problems are particularly acute for complex orders. For example, most markets have rules which require that trades be allocated first to public customers and then to market professionals. In the rare instances when a specialist seeks to trade the legs of a complex order against other orders, he would need to assure that trades be allocated to give a preference to public customer orders. Market rules also require that trades be executed at the best available price, commonly referred to at the best bid or offer (BBO). On an actively traded securities, the BBO can change several times a second, making it extremely difficult for a specialist to effect such trades. BBO volatility also increases leg risk because the time between leg execution is likely to cause subsequent legs to execute at inferior prices, rendering the entire complex order and trading strategy unprofitable.

Beyond the trading processes internal to each option exchange, additional considerations arise when an option is listed on multiple exchanges. In order to assure that an order in a multiply-listed contract receives the best execution price, market professionals are charged with the responsibility of checking the other exchanges' prices, and may be required to contact the other exchange to verify that the prices are valid. Again, a specialist executing a complex order is faced with a difficult task. The process of checking other exchange prices is dependent upon the originating exchange market professionals' personal efforts to verify the other markets' prices. Where the complex order includes a stock leg, this problem is even more acute, since the stock transaction, as well as the option transaction must be executed at the best execution price.

The increasing volume of trades in options contracts, as well as the speed at which price information of underlying stocks is transmitted to consumers, has increased the demand for faster trade execution in today's market. In addition, volatility in the price of underlying stocks that are the basis for options contracts place further pressure on exchanges to execute trades quickly and at an equitable price. Market makers on floor-based markets are limited in the speed at which they can react to market fluctuations and respond with quotations. Moreover, the particular difficulties posed by complex orders drive up costs, decrease liquidity, and increase leg risk.

SUMMARY OF THE INVENTION

It is an advantage of the invention to provide an automated system for trading complex orders that reduces leg risk.

It is a further advantage of the invention to provide an automated system for trading complex orders that assures the complete order will be executed for a net price.

It is yet another advantage of the invention to provide a system for trading complex orders where, prior to executing a complex order, liquidity of each leg of the complex order is assured.

It is a further advantage of the invention to provide a system for trading complex orders where, in the event a leg of the complex order is not executed, orders for the remaining legs are cancelled.

It is a further advantage of the invention to provide a means to synchronize executions of legs of complex orders to be executed on different markets.

Broadly, an exchange for trading complex orders according to the invention stores complex orders along with regular orders from public customers and market professionals, as well as quotations from market makers in a book memory. The exchange automatically compares each complex order against other stored complex orders to determine if the two complex orders can trade. The exchange also compares each leg of the complex order against the regular orders and quotations stored on the book and determines if each leg of the complex order can execute against the regular orders and quotations, either in whole or in part according to the ratios set forth in the complex order. These determinations are made at the current best bid or offer price (BBO), giving preference to customer orders over professional orders. The complex orders are executed against either other complex orders or against regular orders or quotations based on these determinations.

In addition, where a complex order includes a leg in another market, the system will halt trading in the local legs, effectively fixing the execution price of orders in these legs, while it attempts to execute the remaining leg in the other market. If the order in the other market is executed successfully, the remaining legs are executed.

BRIEF DESCRIPTION OF THE DRAWINGS

Further characteristics, features, and advantages of the present invention will be apparent upon consideration of the following detailed description of the invention, taken in conjunction with the following drawings, and in which.

DETAILED DESCRIPTION

Embodiments of the invention will be described in terms of an automated exchange market for stock options; options being contracts for the purchase or sale of a listed security at a particular strike price to be exercised on a particular date in the future and exchanges for the listed security underlying those options. The invention, however, is not limited to the sale of options contracts and may also be applied to other financial instruments such as stocks, bonds, commodity futures contracts, currency, and the like. In addition, a discussion of an automated exchange market for trading financial instruments may be found in U.S. Pat. No. 6,618,707, which is incorporated herein by reference.

Complex Order Process

A complex, combination, or spread order (complex order) contains a set of legs, each leg representing a different financial instrument on the same underlying product. Embodiments of the described and illustrated herein are in terms of each of the legs consisting of series of equity options contracts. However, the invention is not limited to trading equity options complex orders. Rather, the invention can be implemented in any asset class or among several asset classes (such as, for example, legs consisting of index options contracts, futures contracts, stock, bonds, treasury instruments, exchange traded funds, security futures, etc. or any combination thereof), and a discussion of how the invention can be implemented in different or across asset classes is described in detail below.

In order for a complex order to trade, all legs must be simultaneously executed either in whole or in part pursuant to the ratio set forth in the complex order, and the complex order must trade at a single, net price. A complex order may be designated as a market order or limit order, and may contain various conditions or qualifiers, such as, for example, all or none (AON), fill and store (FAS), immediate or cancel (IOC), etc., and have a time in force of day, good till canceled (GTC), delete after n minutes, or some other time in force. A complex order can be entered, changed, canceled, and traded.

Figure 1:
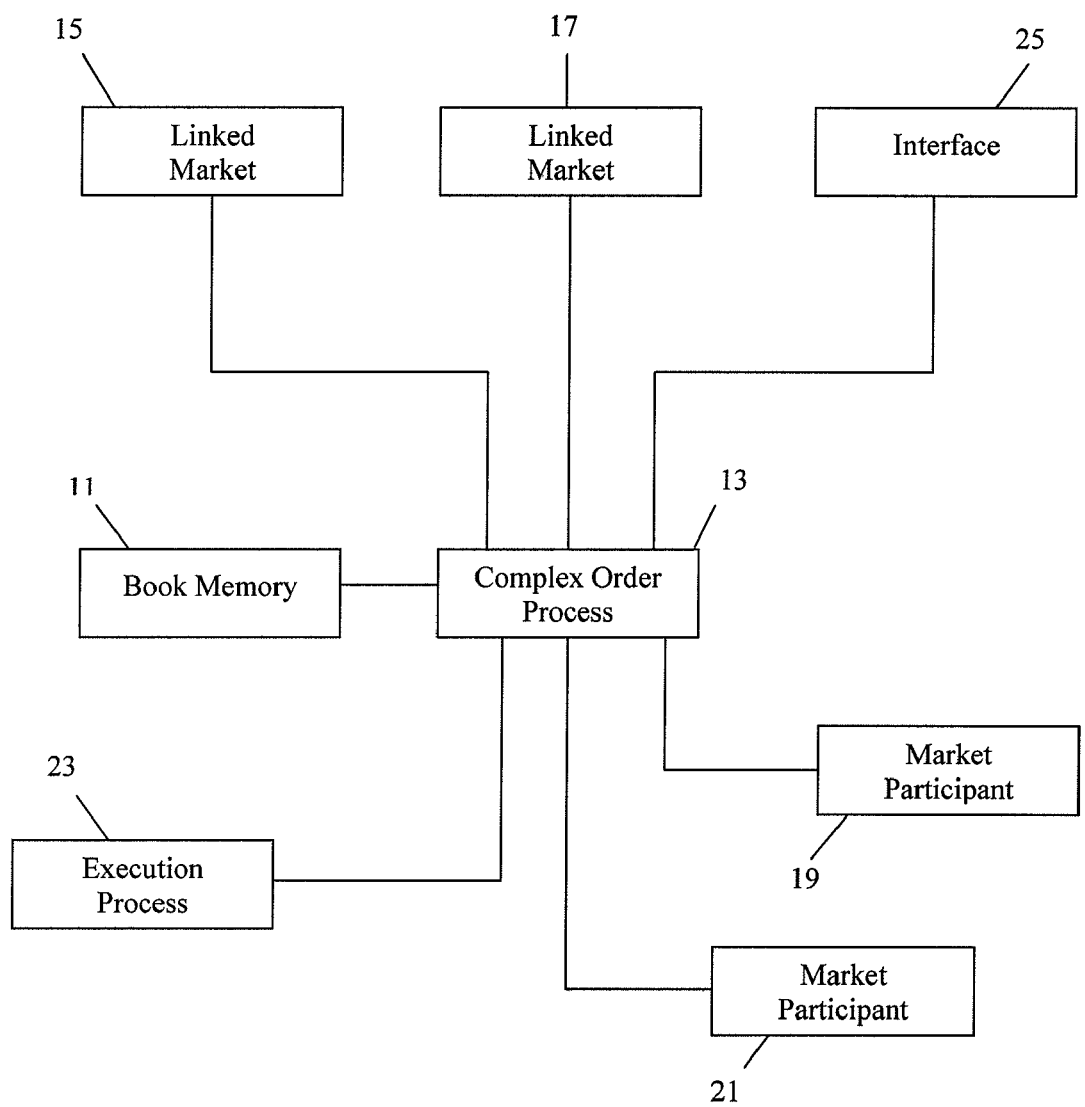
FIG. 1 is a detailed block diagram illustrating the exchange according to an embodiment of the invention.

FIG. 1 is a block diagram showing interconnected processes and entities according to an embodiment of the invention. A centralized orderbook memory 11 stores complex orders and regular orders. The complex order process 13 continually monitors the best price and size of all quotes and orders in the orderbook (including both complex orders and regular orders) (referred to as the best bid and offer or BBO), as well as market information from other linked markets 15,17 (referred to as the OPRA BBO), to determine whether complex orders can match against other complex orders and regular orders. The complex order process 13 assigns priority levels to complex orders and regular orders, and determines the best possible price to trade complex orders, whether it is against other complex orders or regular orders. The complex order process 13 ranks complex orders in time and price priority and matches complex orders according to this ranking to prevent complex orders to trade through or ahead of orders ranked higher in priority or orders at better prices. After receiving a complex order, the complex order process 13 displays the complex order to market participants 19,21 for a programmable period to allow those participants to submit matching orders. Matching orders are ranked during this period in terms of price, allowing for price improvement in trading the complex order.

Once a match is found the complex order process 13 sends the complex order and matching orders to an execution process 23 on the exchange that simultaneously executes the legs of a complex order against regular orders in the orderbook or against a matching complex order, thereby removing market or leg risk. Where the complex order process 13 matches part of the complex order against regular orders and quotations, the match is made so that the quantity of each leg of the complex order matched satisfies the ratios of the legs specified in the complex order. For example, if the complex order is an order to buy 100 of Leg 1 and Sell 50 of Leg 2 (having a ratio of 2 to 1) with a net price of $15 and regular orders to sell 100 at $10 for Leg 1 and to buy 30 at $5 for Leg 2 are showing, the complex order process 50 would cause a trade to buy 60 and sell 30 (keeping the 2 to 1 ratio).

After a complex order has traded, a message is sent to the parties to the trade and trade information is reported to market participants 19, 21 and others. All market participants, including PMMs (Primary Market Makers), CMMs (Competitive Market Makers) and EAMs (Electronic Access Members), can enter complex orders.

An example of a complex order having two legs, both of which consist of series of equity option contracts, is:
Quantity=10
Net Price=0.30
Buy 1 Series 1, ratio 1
Sell 1 Series 2, ratio 1
In this example, the complex order process 13 calculates the best bid or offer (BBO) for each leg of the above complex order is:

|  | $BBO_{bid}$ |  | $BBO_{ask}$ |
|---|---|---|---|
| Leg 1 | 0.50 | × | 0.60 |
| Leg 2 | 0.30 | × | 0.40 |

Thus, in this example, the processor calculates the valid spread range for this order to be 0.10-0.30. The spread range is calculated as follows: (i) multiply the BBO prices by the ratio to get the ratio-adjusted prices; (ii) using the ratio-adjusted prices total the at-market ask prices for the buy legs and the total at-market bid prices for the sell legs; (iii) subtract the sell total from the buy total (this yields 0.30); (iv) repeat step ii using the opposite side of the BBO and total bid prices for buy legs and total offer prices for sell legs; and (v) subtract sell total from buy total (this yields 0.10). The complex order process 13 uses this spread range to maximize the matching possibilities (and thus liquidity available) for the complex order. For a complex order, the price of each leg can vary, but the net price cannot be greater than 0.30 per contract. The bottom of the range is also referred to as the synthetic low. The top of the range is referred to as the synthetic high.

The user entering the complex order can change some of the values of the complex order or delete it. Examples of some changes include, but are not limited to: decreasing the volume; selecting open or close; changing the validity time from, e.g., GTC to rest of day; changing the broker identity; changing the client identity; changing the free text; changing the clearing member; changing the order type from interest to limit, etc.

Figure 2:
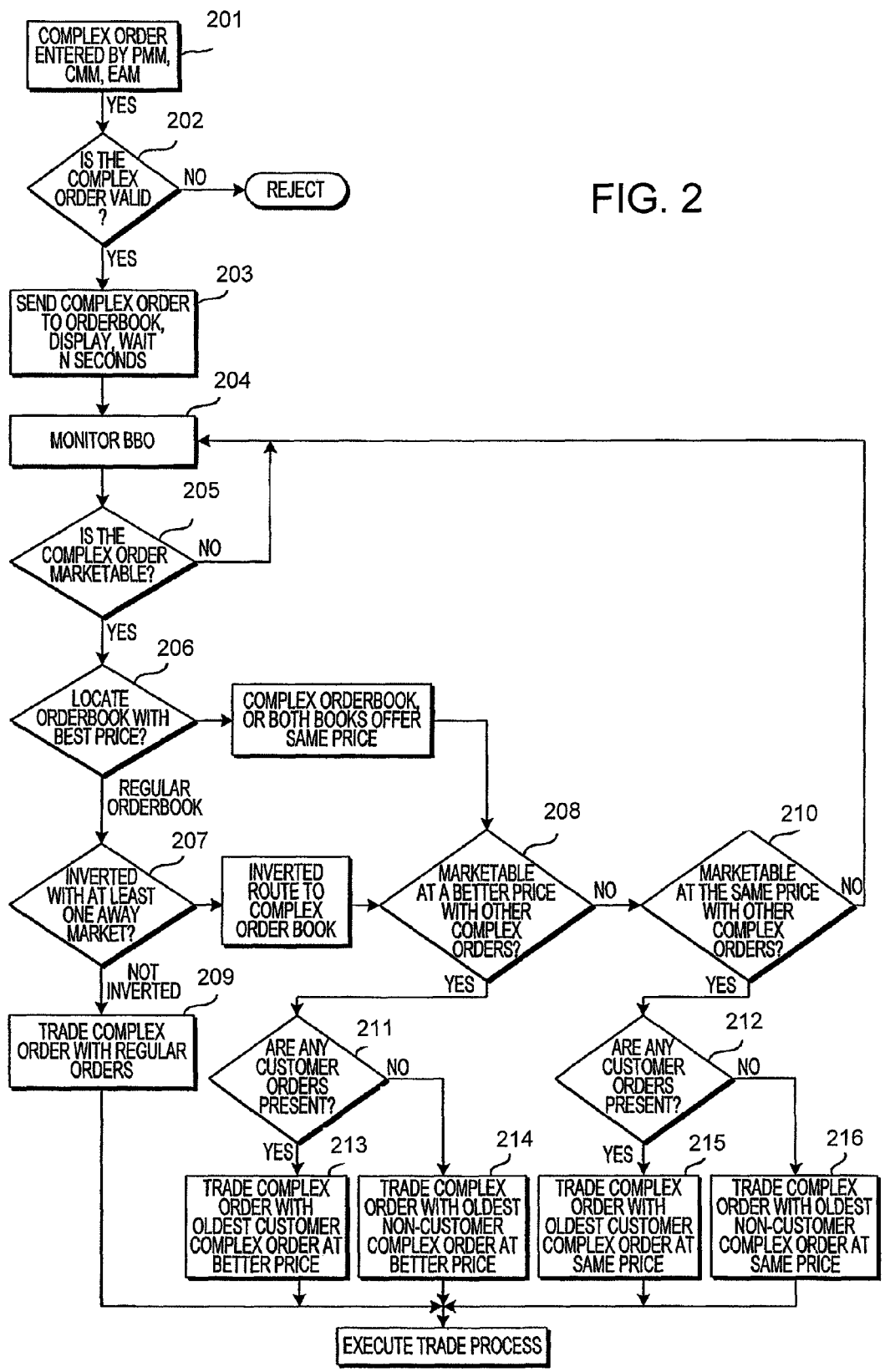
FIG. 2 is a flow chart showing processing of a complex order according to an embodiment of the invention.

FIG. 2 shows the operation of the complex order process 13 according to an embodiment of the invention. At Step 201, a complex order is entered into the system by a PMM (primary market maker), CMM (competitive market maker), or EAM (electronic exchange member). At Step 202, the system validates the complex order. A valid complex order has a net price (which may be specified as fixed price or market price) and at least one leg. Each leg includes: (1) the series; (2) the ratio; (3) buy or sell value; and (4) the quantity. If the complex order is not valid, the complex order is rejected. If the complex order is valid, the complex order is sent to the orderbook 11 and displayed to market participants 19, 21. At Step 203, the system introduces an optional delay of n seconds before the processor starts seeking matches for the complex order. The purpose of the delay is to provide market participants 19, 21 with an opportunity to trade against the order and/or improve the execution price of the order through submitting inverse (or opposite) orders. This parameter can be changed dynamically intraday by the administering exchange and can optionally be set to zero. If the complex order is traded during the delay period, the complex order is removed from the book and reported to the relevant market participants.

If the complex order is not traded during the delay period, at Step 204, the complex order process 13 is triggered and it checks the BBO for each leg of the complex order. The complex order process 13 rechecks the BBO each time it is retriggered. The complex order process 13 is retriggered by certain events, such as, for example: (1) a series status change; (2) a BBO update; (3) an OPRA BBO update; and (4) a complex order update. When the complex order process 13 is triggered, it: (a) selects the complex orders relating to the complex order or series that caused the trigger from the orderbook 11; (b) lists the selected complex orders by receipt time; (c) groups the selected complex orders by identical leg characteristics; and (d) sorts the selected complex orders with identical leg characteristics in price-time priority.

At Step 205, the complex order process 13 uses validations to determine whether the complex order is marketable against other complex orders and regular orders. The validations include determining whether: (1) the series for each leg has a valid price; (2) the series for each leg has a valid trading status; (3) a prior primary complex order with the same attributes partially traded; and (4) a prior primary complex order with the same attributes did not fail. If a prior complex order with the same attributes failed to be matched, the complex order process 13 skips the complex order.

The BBO for each series of the regular orders is used to calculate the value of the complex order. The synthetic low is the lowest price; the synthetic high is the highest price. The synthetic low and high are also referred to as the complex order BBO from the regular orders. The net price of the complex order must be greater than or equal to the synthetic low. If there is a customer order at the low, the net price of the complex order must be greater than the synthetic low. The net price of the complex order must be less than or equal to the synthetic high plus a price buffer. The price buffer is a parameter configurable by the administering exchange. Optionally, the price buffer may be set to zero.

If the complex order is not marketable, the complex order is not traded and the system loops back to monitoring the BBO at Step 204 and waits for the complex order process 13 to retrigger. If the complex order is marketable, the complex order process 13 determines whether an inverse complex order or regular orders on the orderbook offer a better price to trade the complex order at Step 206. To do so, the complex order process 13 (1) sorts the inverse complex orders by price then time priority, ignoring such orders if (a) they are less than the net price that was requested by the complex order, and (b) their net price is outside of the valid spread range of the complex order; and (2) checks the best complex order price against the current best matching price against regular orders.

Specifically, the complex order process 13 prioritizes, sorts, and ranks the inverse complex orders to determine the best inverse complex order in the following manner:

(a) The complex order process 13 multiplies the net price of the first inverse complex order by −1 to create the calculated net price;

(b) If the calculated net price is less than or equal to the complex order and the synthetic high, this inverse complex order is queued with the complex order. Otherwise, the inverse complex order is skipped;

(c) If the calculated net price is less than the current best matching price, this inverse complex order is queued with the complex order and the calculated net price becomes the new current best matching price;

(d) If the calculated net price is equal to the current best matching price and the synthetic high, and there is no customer at the synthetic high, this inverse complex order is queued in time priority;

(e) If the calculated net price is equal to the current best matching price but not equal to the synthetic high, and this inverse complex order is older than the previously saved match, this new inverse complex order is queued with the complex order;

(f) The complex order process 13 completes steps (a)-(e) for each of the remaining inverse complex orders and saves the best match.

The complex order process 13 does not queue the complex orders if:

(a) The complex order is AON and the quantity is greater than the quantity of the inverse complex order;

(b) The inverse complex order is AON and the quantity is greater than the quantity of the complex order;

(c) The calculated net price of the inverse complex order is less than the synthetic low minus the configurable price buffer.

As a result of the foregoing steps, at Step 207, the complex order process 13 compares the best inverse complex order price to the best regular order price. If regular orders represent the best price, the processor seeks to match the complex order against the regular orders. If an inverse complex order represents the best price, the complex order process 13 seeks to match the complex order against an inverse complex order. If both an inverse complex order and regular orders represent the same price and there would be no priority or other trading violations, the complex order process 13 seeks to match the complex order against an inverse complex order.

Specifically, at Step 207, if the complex order process 13 seeks to match the complex order with regular orders, the complex order process 13 checks whether any of the legs of the complex order are inverted. If none of the legs of the complex order are inverted, the complex order process 13 matches the trade against the regular orders at Step 209. An allocation algorithm, as disclosed in U.S. Pat. No. 6,618,707 may be used to trade legs of the complex orders and regular orders. If one or more of the legs of the complex order is inverted, the complex order process 13 seeks to match the complex order against an inverse complex order at Step 208.

If the best price match is an inverse complex order and the complex order is older, the complex order is matched with the inverse complex order at the price of the complex order.

If the net price of the complex order: (1) is greater than the synthetic high, the net price becomes the new synthetic high; (2) is equal to the synthetic high and there is a customer at the high, the processor ticks the net price lower (if the net price is lower than the limit price of the inverse complex order or below the low end of the range, the complex order process 13 does not match the complex orders); (3) is less than the synthetic low, the complex order process 13 does not match the complex orders; and (4) is equal to the synthetic low and there is a customer at the low, the complex order process 13 does not match the complex orders.

If the best match is an inverse complex order and the complex order is younger, the complex order is matched with the inverse complex order at the price of the inverse complex order.

If the net price of the inverse complex order: (1) is less than the synthetic low, the net price becomes the new synthetic low; (2) is equal to the synthetic low and there is a customer at the low, tick the net price higher (if the net price is higher than the limit price of the complex order or greater than the high end of the range, the complex order process 13 does not match the complex order); (3) is greater than the net price of the complex order or the synthetic high, the complex order process 13 does not match the complex order; and (4) is equal to the synthetic high and there is a customer at the high, the processor does not match the complex order.

After the complex order process 13 matches the complex order with the best inverse order, it executes the trade. The trade may consist of a trade between two complex orders on the orderbook 11 at a specified net price; a complex order against regular orders on the orderbook 11 at the price of the book, up to the limit of the complex order; and a complex order against regular orders on the orderbook 11, then trade the complex order against other complex orders on the orderbook 11.

After the complex order process 13 matches the complex order with the best regular orders, it executes the trade. An allocation algorithm, as disclosed in U.S. Pat. No. 6,618,707 may be used. Each leg of the complex order is executed at the book price, and the complex order process 13 ensures that the current BBO for each leg will not exceed the limit price of the complex order.

After a complex order is executed, the system: (1) recalculates the BBO and sends it to all market participants; (2) reports the details of the trade to OPRA; and (3) sends the trade record to clearing members.

As discussed above, the invention can be implemented in any asset class or across asset classes. By way of example, the invention can be implemented in trading stock and equity options complex orders. The complex order process 13 eliminates leg risk by executing such complex orders as a single transaction. The complex order process 13 records and processes market data from each of the linked markets 15,17 on which the instruments are traded. According to one embodiment it also receives market information from SIAC (for CTS and CQS) and ISE (for ISE market and order information) via the interface 25. The complex order process 13 then processes the stock and options market information to determine matching opportunities and execute the legs of the trades in multiple markets as a single transaction at a net price. If the complex order process 13 cannot complete each leg of the complex order in a quantity consistent with any ratios specified in the complex order, the complex order process 13 will not execute the trade. The complex order process 13 triggers may include additional events based on the particular type of asset class.

According to one embodiment, when trading stock and equity option complex orders, the complex order process 13 triggers on an updated BBO on the stock leg, changes to up-tick when short-selling certain securities, and the like. The complex order process 13 continues to trade such complex orders at a single, net price, and would further enhance liquidity available to these orders as a result of the wider price range available to it to execute such orders as a single transaction. According to this embodiment, the complex order process 13 calculates an options price range, a stock price range, and a total price range within which both the stock and options legs could trade.

Series Freeze Process

One common trading strategy is the combination of one or more option legs and a leg for shares of the underlying stock at a certain ratio of options to shares, where the trade takes place at a net price. The options and the shares may not be available on a single market or may not be available on a single market at the best price. According to an embodiment of the invention, where different legs of a complex order are executed on different markets, the system provides a mechanism for synchronizing execution on those markets.

According to this embodiment, synchronized execution of such combination orders is accomplished by halting or "freezing" transactions for the leg or legs of the order being executed in the system while it attempts to execute the remaining leg in a remote market. In a preferred embodiment, transactions in the series of options is frozen while the stock leg of the order is executed. Alternatively, trading on the stock market for the stock leg may be frozen while the options leg is being executed. Note that the system is continuously checking the prices and only does the freeze if it appears that the prices do line up. If so, it locks the series, checks again, and if still good it sends an IOC order to the remote market.

After a period of time has elapsed, or if the stock leg is fully executed, the option series that were halted or frozen are unfrozen. If the stock leg is executed or partially executed, the options leg is executed. The quantity of options executed depends on the desired ratio of the complex order and on the number of stock shares executed. While the trading of the option series is frozen, all transactions for those option series are queued. Queued transactions are processed in time priority when trading in the series resumes.

Figure 3:
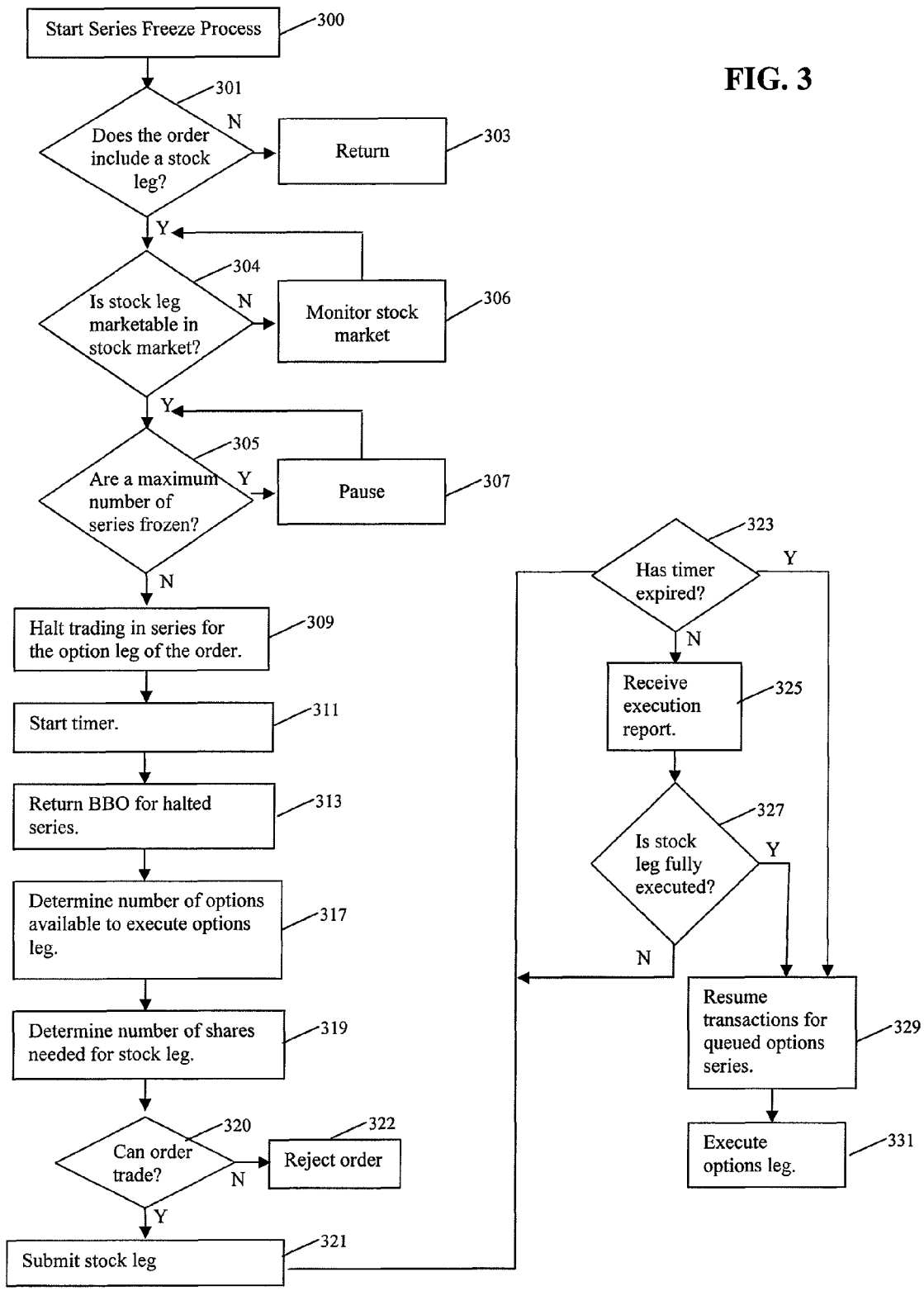
FIG. 3 is a flow chart showing processing of a complex order according to another embodiment of the invention.

FIG. 3 is a process flow diagram illustrating an embodiment of the invention. When an order is received by the complex order process 13 that includes one or more legs that will be executed on another market, the process shown in FIG. 3 is executed. The preferred embodiments are described in terms of a complex order with an options leg and a leg for the stock underlying that option. But the invention is not limited to processing complex orders including these securities. As those skilled in the field of the invention will appreciate, the present invention is applicable to complex orders including other types of securities, for example, those including legs for futures contracts and the underlying commodity or currency, or index options and the corresponding exchange traded fund.

At step 301 the system determines whether the complex order includes a stock leg. If not, the Series Freeze concept is not used. If there is a stock leg, at step 305 the system determines whether freezing the options series for this complex order will exceed a predetermined maximum number of frozen series for the orderbook. If so, at step 307 this attempt to freeze the series is rejected and the system will try again after a short delay. This is to ensure that freezing the series does not cause latency in the overall exchange functionality because too many series are frozen at one time. A series freeze request will also be denied if the series is already frozen or if series freezing has been disabled. The rejection reason will be logged.

At step 309 the option series for the options leg or legs of the complex order is placed in a halted or Frozen state and all further transactions for this series will be queued. At step 311 a timer is started. The time will expire after a predetermined interval, after which the Frozen series will be unfrozen should the remote exchange fail to respond within a reasonable timeframe. The BBO of the frozen series is recalculated. At step 317 the system will recalculate the number of options available on each options leg and at step 319, the system will calculate the number of shares needed to satisfy this order, given the number of options that are available on each leg.

At step 320 the system determines if the complex order cannot trade, because, for example, there is insufficient liquidity on the options or stock markets to fill an order with an AON or FOK instruction or because the net price cannot be achieved. If so, at step 322 the complex order is rejected.

At step 321, the system submits the stock leg to a stock exchange. According to one embodiment, the stock leg is sent to NYFIX® for execution, but it can be sent to any stock exchange interface. At step 323, the system determines if the timer has expired. If the timer has not expired, at step 325 an execution report is received from the stock exchange. At step 327 the system determines if there are additional stock transaction required to fill the stock leg. If the stock execution request is for a market order, the fill could be at the multiple price levels and the stock market will send multiple execution reports for each price level. Once either the stock leg is filled or the timer expires, the options series is unfrozen and the options leg as well as any queued transactions are executed in steps 329 and 331. According to a preferred embodiment, this is accomplished by the system sending another message that instructs the OMX CLICK Exchange system to place the frozen options series state back to "Regular" trading. If the order is not fully filled before the timer expires, the option leg will be traded on partial stock executions and/or continue with the regular matching process. If an IOC or FOK cancel report is received for the stock leg, a series unfreeze request will be sent to the options leg.

The above embodiments are illustrative of the present invention. It is to be understood that the invention is not intended to be limited by this disclosure, but rather is intended to cover various modifications and equivalent arrangements included within the spirit and scope of the invention, as will be apparent to a person of ordinary skill in the art.

I claim:

1. A method for executing a financial transaction to trade a complex order comprising the steps of:
   providing an interface;
   providing a processor connected with the interface;
   providing an instruction memory connected with the processor for storing processing instructions;
   receiving a complex order via the interface, the complex order including a first order to purchase or sell a first quantity of a first financial instrument and a second order to purchase or sell a second quantity of a second financial instrument;
   identifying a first market on which to purchase or sell the first instrument;
   identifying a second market on which to purchase or sell the second instrument;
   halting trading of the first instrument on the first market using the processor executing the processing instructions;
   transmitting the second order via the interface to the second market for execution while trading of the first instrument on the first market is halted;
   determining that the whole of the second quantity of the second instrument was purchased or sold using the processor executing the processing instructions; and
   executing the purchase or sale for the first quantity of the first instrument on the first market using the processor executing the processing instructions, wherein the first quantity and the second quantity represent a predetermined ratio.

2. The method of claim 1, further comprising the steps of:
   determining that less than the whole of the second quantity was purchased or sold using the processor executing the processing instructions; and
   executing the purchase or sale of a portion of the first quantity of the first instrument on the first market using the processor executing the processing instructions, wherein the portion of the first quantity and the portion of the second quantity represent the predetermined ratio.

3. The method of claim 1, further comprising the step of determining a cost to purchase or sell the first and second quantities of the first and second instruments based on prices for the instruments on the first and second markets while trading of the first instrument is halted on the first market using the processor executing the processing instructions.

4. The method of claim 1, further comprising the steps of:
   determining a time that trading of the first instrument on the first market has been halted using the processor executing the processing instructions;
   determining that the time has exceeded a predetermined maximum market halt period using the processor executing the processing instructions; and
   cancelling the first second orders if the step of executing has not occurred using the processor executing the processing instructions.

5. The method of claim 1, wherein the first order is for the purchase or sale of a derivative security and the second order is for the purchase or sale of the underlying instrument of the derivative security.

6. The method of claim 1, wherein the first order is for the purchase or sale of stock options contracts and the second order is for the purchase or sale of the stock underlying the options contracts.

7. The method of claim 1, wherein the step of executing the first order of the complex order is contingent on the execution of the second order on the second market.

8. The method of claim 3, wherein the complex order further comprises a net price and wherein the method further comprises the steps of
   determining that the cost of the complex order exceeds the net price; and
   canceling the first and second orders.

9. The method of claim 1, wherein at least one of the first and second financial instruments includes at least one options contract.

10. The method of claim 1, wherein at least one of the first and second financial instruments includes at least one futures contract.

11. The method of claim 10, wherein at least one of the first and second financial instruments includes an amount of a commodity underlying the at least one futures contract.

12. The method of claim 1, further comprising the steps of
    implementing an arrival delay timer for determining an arrival delay period using the processor executing the processing instructions; and
    delaying the steps of halting, transmitting, determining and executing for the arrival delay period after receiving the complex order using the processor executing the processing instructions.

13. The method of claim 3, further comprising the steps of:
    determining that the cost is greater than a net price using the processor executing the processing instructions;
    postponing the steps of halting, transmitting, determining, and executing using the processor executing the processing instructions;
    monitoring prices on the first and second markets using the processor executing the processing instructions; and
    resuming the steps of halting, transmitting, determining; and executing when the cost is less than or equal to the net price using the processor executing the processing instructions.

14. The method of claim 9, wherein at least one of the first and second financial instruments includes at least one order to purchase or sell stock underlying the at least one options contract.

15. A method for executing a financial transaction to trade a complex order comprising the steps of:
    providing an interface;
    providing a processor connected with the interface;
    providing an instruction memory connected with the processor for storing processing instructions;
    receiving a complex order via the interface, the complex order including a first order to purchase or sell a first quantity of a first financial instrument, a second order to purchase or sell a second quantity of a second financial instrument, and a net price to execute the complex order;
    identifying a first market on which to purchase or sell the first instrument;
    identifying a second market on which to purchase or sell the second instrument;
    halting trading of the first instrument on the first market using the processor executing the processing instructions;
    determining the net execution price to execute the complex order while trading of the first instrument on the first market, is halted using the processor executing the processing instructions;

determining that the net execution price is less than or equal to the net price using the processor executing the processing instructions;

transmitting the second order via the interface to the second market for execution while trading of the first instrument on the first market is halted; and executing the purchase or sale for the first quantity of the first instrument on the first market using the processor executing the processing instructions.

16. The method of claim 15, further comprising the steps of:

determining that the net execution price is greater than the net price using the processor executing the processing instructions;

monitoring prices on the second market; and transmitting the second order via the interface to the second market for execution when the price to purchase or sell the second order is such that the net execution price is less than the net price.

* * * * *